US011191212B2

(12) United States Patent
Brimeyer et al.

(10) Patent No.: US 11,191,212 B2
(45) Date of Patent: Dec. 7, 2021

(54) CONTROLLED FLOAT ON AN AGRICULTURAL HARVESTER FOR HEADER LEVELING

(71) Applicant: Deere & Company, Moline, IL (US)

(72) Inventors: Alex Brimeyer, Bettendorf, IA (US); David E. Renner, Rock Island, IL (US); Michael L. Vandeven, Princeton, IA (US); Joshua R. Pierson, Bettendorf, IA (US); Todd M. Verhoef, Davenport, IA (US)

(73) Assignee: Deere & Company, Moline, IL (US)

( * ) Notice: Subject to any disclaimer, the term of this patent is extended or adjusted under 35 U.S.C. 154(b) by 300 days.

(21) Appl. No.: 16/392,156

(22) Filed: Apr. 23, 2019

(65) Prior Publication Data
US 2020/0337240 A1 Oct. 29, 2020

(51) Int. Cl.
*A01D 41/14* (2006.01)
*A01D 41/127* (2006.01)
(Continued)

(52) U.S. Cl.
CPC .......... *A01D 41/141* (2013.01); *A01B 63/008* (2013.01); *A01B 63/108* (2013.01);
(Continued)

(58) Field of Classification Search
CPC ................ A01B 63/108; A01B 63/008; F15B 2211/625; F15B 2111/3127;
(Continued)

(56) References Cited

U.S. PATENT DOCUMENTS 3,509,701 A   5/1970   Evans
3,953,959 A   5/1976   Decruyenaere
(Continued)

FOREIGN PATENT DOCUMENTS

EP   1264989 A1   12/2002
FR   2534771 A1   4/1984

OTHER PUBLICATIONS

Non-Final Office Action for U.S. Appl. No. 16/392,120 dated May 5, 2021, 12 pages.
(Continued)

*Primary Examiner* — Arpad Fabian-Kovacs
(74) *Attorney, Agent, or Firm* — Christopher J. Volkmann; Kelly, Holt & Christenson, PLLC

(57) ABSTRACT

A header assembly for an agricultural harvesting machine comprises a first frame assembly, a second frame assembly that supports a cutter, and is movable relative to the first frame assembly, a float cylinder coupled between the first frame assembly and the second frame assembly, an accumulator, a controllable reservoir, and fluidic circuitry. The fluidic circuitry comprises a first conduit forming a first fluid path that provides a flow of pressurized fluid under pressure to the float cylinder, so the float cylinder exerts a float force on the second frame assembly, a valve mechanism that is actuatable to inhibit fluid flow along the first fluid path between the accumulator and the float cylinder, a second conduit forming a second fluid path fluidically coupled to the controllable reservoir, the controllable reservoir being controllable to add fluid to the float cylinder.

20 Claims, 8 Drawing Sheets

(51) Int. Cl.
*A01B 63/00* (2006.01)
*A01B 63/108* (2006.01)
*F15B 1/26* (2006.01)
*F15B 13/02* (2006.01)
*F15B 1/02* (2006.01)
*F15B 11/08* (2006.01)

(52) U.S. Cl.
CPC ......... *A01D 41/127* (2013.01); *A01D 41/145* (2013.01); *F15B 1/26* (2013.01); *F15B 1/02* (2013.01); *F15B 11/08* (2013.01); *F15B 13/021* (2013.01); *F15B 2211/30565* (2013.01); *F15B 2211/3127* (2013.01); *F15B 2211/625* (2013.01)

(58) Field of Classification Search
CPC .......... F15B 2211/30565; F15B 13/021; F15B 11/08; F15B 1/26; F15B 1/02; A01D 47/00; A01D 41/145; A01D 41/141; A01D 41/1278; A01D 41/127; A01D 41/06
See application file for complete search history.

(56) References Cited

U.S. PATENT DOCUMENTS

| | | | |
|---|---|---|---|
| 4,718,325 A | 1/1988 | Shore | |
| 4,733,523 A | 3/1988 | Dedeyne et al. | |
| 4,825,655 A | 5/1989 | Buchl et al. | |
| 5,964,077 A * | 10/1999 | Guinn | A01D 41/14 56/10.2 E |
| 5,992,146 A | 11/1999 | Hausman | |
| 6,085,501 A | 7/2000 | Walch et al. | |
| 6,220,289 B1 * | 4/2001 | Zenker | F15B 13/015 137/596.2 |
| 6,263,977 B1 | 7/2001 | Mayerle et al. | |
| 6,647,721 B2 | 11/2003 | Heyne et al. | |
| 6,675,568 B2 | 1/2004 | Patterson et al. | |
| 6,901,729 B1 | 6/2005 | Otto et al. | |
| 6,973,779 B2 | 12/2005 | Naaktgeboren et al. | |
| 7,168,226 B2 | 1/2007 | McLean et al. | |
| 7,261,030 B2 | 8/2007 | Liberfarb et al. | |
| 7,555,883 B2 | 7/2009 | Fackler et al. | |
| 7,647,755 B2 | 1/2010 | Barnett et al. | |
| 7,661,251 B1 * | 2/2010 | Sloan | A01D 41/145 56/10.2 E |
| 7,703,266 B2 | 4/2010 | Fackler et al. | |
| 7,707,811 B1 | 5/2010 | Strosser | |
| 7,793,740 B2 | 9/2010 | Thomson et al. | |
| 7,861,506 B2 | 1/2011 | Humbert | |
| 7,869,922 B2 * | 1/2011 | Otto | A01D 41/145 701/50 |
| 8,001,751 B2 | 8/2011 | Ehrhart et al. | |
| 8,401,745 B2 | 3/2013 | Otto et al. | |
| 8,572,938 B2 * | 11/2013 | Deneault | A01D 41/141 56/10.2 E |
| 9,043,955 B2 | 6/2015 | Nafziger et al. | |
| 9,681,601 B2 | 6/2017 | Bassett | |
| 9,717,180 B2 | 8/2017 | Teach et al. | |
| 9,968,033 B2 | 5/2018 | Dunn et al. | |
| 2001/0002533 A1 | 6/2001 | Rhody et al. | |
| 2003/0074876 A1 | 4/2003 | Patterson et al. | |
| 2006/0144028 A1 * | 7/2006 | McLean | A01D 41/141 56/10.4 |
| 2006/0150604 A1 * | 7/2006 | Kieffer | A01B 63/10 56/15.8 |
| 2011/0047946 A1 * | 3/2011 | Otto | F15B 13/044 56/10.2 E |
| 2014/0360174 A1 * | 12/2014 | Sohn | E02F 9/226 60/464 |
| 2014/0373519 A1 * | 12/2014 | Franzoni | F15B 13/044 60/327 |
| 2016/0037721 A1 | 2/2016 | Teach et al. | |
| 2016/0316624 A1 | 11/2016 | Ritter et al. | |
| 2017/0191506 A1 * | 7/2017 | Lacher | F15B 11/028 |
| 2017/0215329 A1 | 8/2017 | Lacher et al. | |
| 2017/0261009 A1 * | 9/2017 | Paulessen | A01B 63/10 |
| 2017/0359955 A1 | 12/2017 | Dunn et al. | |
| 2018/0153101 A1 | 6/2018 | Dunn et al. | |
| 2018/0153102 A1 | 6/2018 | Dunn et al. | |
| 2018/0180068 A1 * | 6/2018 | Fukuda | E02F 9/2217 |
| 2018/0359920 A1 | 12/2018 | Dunn et al. | |
| 2019/0110404 A1 * | 4/2019 | Vandeven | A01D 41/141 |
| 2019/0191615 A1 * | 6/2019 | Thompson | A01F 15/07 |
| 2019/0200523 A1 * | 7/2019 | Fay, II | A01D 41/145 |
| 2020/0077585 A1 * | 3/2020 | Garbaid | A01B 63/008 |
| 2020/0305348 A1 * | 10/2020 | Karst | A01D 41/127 |
| 2020/0337239 A1 * | 10/2020 | Brimeyer | A01B 63/008 |
| 2020/0337241 A1 * | 10/2020 | Brimeyer | A01B 63/1013 |
| 2020/0344951 A1 | 11/2020 | Vandeven et al. | |
| 2021/0063265 A1 | 3/2021 | Smith et al. | |

OTHER PUBLICATIONS

Response to Restriction Requirement filed for U.S. Appl. No. 16/366,317 dated Apr. 29, 2021, 2 pages.
Application and Drawings for U.S. Appl. No. 16/392,120, dated Apr. 23, 2019, 28 pages.
Application and Drawings for U.S. Appl. No. 16/392,082, dated Apr. 23, 2019, 31 pages.
Application and Drawings for U.S. Appl. No. 16/366,317, dated Mar. 27, 2019, 34 pages.
Non-Final Office Action for U.S. Appl. No. 16/392,082 dated Apr. 15, 2021, 16 pages.
Restriction Requirement for U.S. Appl. No. 16/366,317 dated Apr. 9, 2021, 5 pages.
Non-Final Office Acton for U.S. Appl. No. 16/366,317 dated Jun. 9, 2021, 10 pages.
Non-Final Office Action for U.S. Appl. No. 16/366,317 dated Sep. 7, 2021, 8 pages.

* cited by examiner

CONTROLLED FLOAT ON AN AGRICULTURAL HARVESTER FOR HEADER LEVELING

FIELD OF THE DESCRIPTION

This description generally relates to agricultural equipment. More specifically, but not by limitation, the present description relates to a system for applying float pressure on the header of an agricultural harvester.

BACKGROUND

There is a wide variety of different types of agricultural equipment. Some such equipment includes agricultural harvesters.

It is common for agricultural harvesters (such as combine harvesters, forage harvesters, windrowers, etc.) to have a header. On an example combine, the header is attached to a feeder house by an attachment frame. The header has a main frame that supports a cutter bar and a reel. The main frame is movable relative to the attachment frame. As the harvester travels, the header engages crop, severs it and transfers the crop into the harvester for further processing.

One type of cutting platform for a combine is referred to as a draper platform, which utilizes a flat, wide belt, referred to as a draper or draper belt to convey crop material. The arrangement and number of belts vary among platforms. One style of draper platform has two side belts that convey crop material longitudinally, to the center of the platform, where a center feed belt moves the crop material laterally into the feeder house. Each belt is wrapped around a pair of rollers, one being a drive roller and the other being an idler roller.

The discussion above is merely provided for general background information and is not intended to be used as an aid in determining the scope of the claimed subject matter.

SUMMARY

An example header assembly for an agricultural harvesting machine comprises a first frame assembly, a second frame assembly that supports a cutter, and is movable relative to the first frame assembly, a float cylinder coupled between the first frame assembly and the second frame assembly, an accumulator, a controllable reservoir, and fluidic circuitry. The fluidic circuitry comprises a first conduit forming a first fluid path that provides a flow of pressurized fluid under pressure to the float cylinder, so the float cylinder exerts a float force on the second frame assembly, a valve mechanism that is actuatable to inhibit fluid flow along the first fluid path between the accumulator and the float cylinder, a second conduit forming a second fluid path fluidically coupled to the controllable reservoir, the controllable reservoir being controllable to add fluid to the float cylinder.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Some harvester headers have a main frame that supports the header structure. Example agricultural harvesters include, but are not limited to, combine harvesters, forage harvesters, and windrowers, etc. The main frame is movable relative to a traction unit (such as a combine harvester) by a positioning actuator so the header can be positioned at a desired height relative to the ground (e.g., in order to float above the ground, and sometimes in order to set a tilt angle of the header as well).

It is believed that improved harvesting performance can be achieved when the header generally follows the surface of the ground, so that it maintains roughly the same distance above the ground throughout the harvesting operation.

In order to achieve better ground following performance, some harvesters are configured with a float assembly that applies a float force to the header and/or to portions of the header, such as wing sections in the case of a winged draper. The float force is a lifting force (e.g., to the main frame relative to the traction unit) oriented to maintain the header (or portions thereof) at the given distance above the ground. This allows the header to respond to changing ground levels and to contact with obstacles to better follow the ground.

The header often has ground engaging elements which provide a ground reference input to the header. Therefore, if the ground underneath the header falls, the header is normally weighted sufficiently to overcome the float force so the main frame drops to follow the ground downward. If the ground under the header rises, then the ground engaging elements act to aid the float force in lifting the header (e.g., lifting the main frame) to follow the ground upward.

It is also not uncommon for there to be obstacles (such as dirt, root balls, rocks, or other obstacles) in the path of the harvester. When the header (or the ground engaging elements) contact an obstacle, this can impart a lifting force (or pulse) on the header as well. The float force allows the header to respond to the upwardly directed force, by rising up, and then settling back to its original position relative to the ground.

In some systems, a float cylinder is hydraulically coupled to an accumulator. The accumulator provides hydraulic fluid under pressure to the float cylinder, which, in turn, provides the lifting force. When an upwardly directed force is imparted on the header (such as when the header, or a ground engaging element of the header, strikes an obstacle on the ground) the header rises, assisted by the float force, and the float cylinder draws hydraulic fluid out of the accumulator. The header then falls back to its original position, because the weight of the header overcomes the upwardly directed float force (e.g., pressure in the accumulator).

Figure 1:
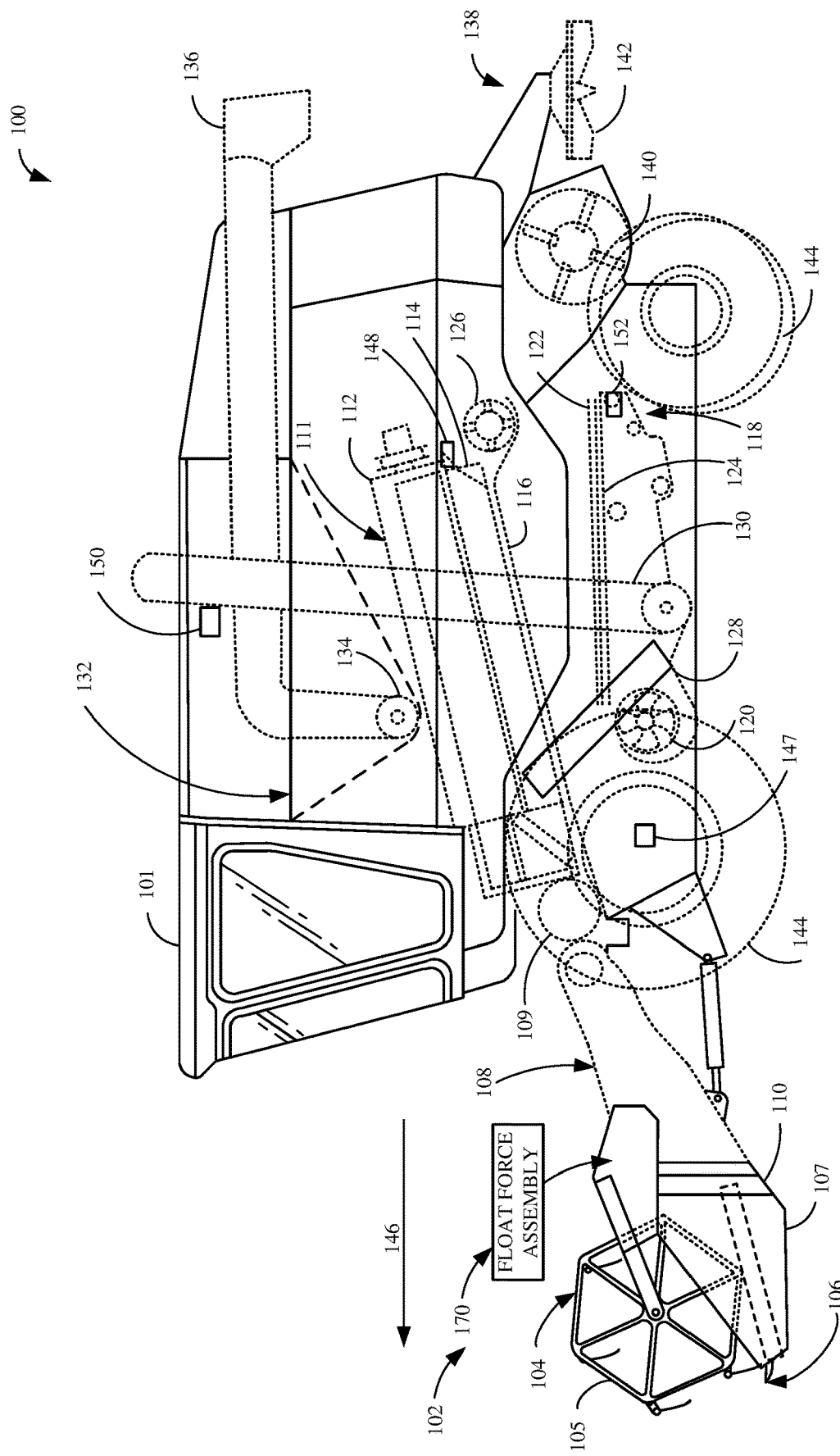
FIG. 1 is a partial pictorial, partial schematic view of one example of a combine harvester.

FIG. 1 is a partial pictorial, partial schematic, illustration of an agricultural machine 100, in an example where machine 100 is a combine harvester (also referred to as combine 100 or machine 100). It can be seen in FIG. 1 that combine 100 illustratively includes an operator compartment 101, which can have a variety of different operator interface mechanisms, for controlling combine 100. Combine 100 includes a set of front end equipment, forming a cutting platform 102, that includes a header 104 having a cutter generally indicated at 106. It can also include a feeder house 108, a feed accelerator 109, and a thresher generally indicated at 111. Thresher 111 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 108 and feed accelerator 109) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

Combine 100 can be equipped with removable cutting platforms that are designed for particular crops. One example, sometimes called a grain platform, is equipped with a reciprocating knife cutter bar, and features a revolving reel with metal or plastic teeth to cause the cut crop to fall into the auger once it is cut. Another example includes a cutter bar that can flex over contours and ridges to cut crops such as soybeans that have pods close to the ground. Some headers designed for wheat, or other similar crops, include draper headers, and use a fabric or rubber apron instead of a cross auger. Often, a draper platform includes one or more draper belts that move severed material, that is harvested from an agricultural field, into a header of the agricultural harvesting machine. In one example, this includes one or more draper belts on each side of the header configured to receive and move severed material to a center section of the agricultural header.

As shown in FIG. 1, header 104 has a main frame 107 and an attachment frame 110. Header 104 is attached to feeder house 108 by an attachment mechanism on attachment frame 110 that cooperates with an attachment mechanism on feeder house 108. Main frame 107 supports cutter 106 and reel 105 and is movable relative to attachment frame 110. In one example, main frame 107 and attachment frame 110 can be raised and lowered together to set a height of cutter 106 above the ground over which combine 100 is traveling. In another example, main frame 107 can be tilted relative to attachment frame 110 to adjust a tilt angle with which cutter 106 engages the crop. Also, in one example, main frame 107 can be rotated or otherwise movable relative to attachment frame 110 in order to improve ground following performance. The movement of main frame 107 together with attachment frame 110 can be driven by actuators (such as hydraulic actuators) based on operator inputs or automated inputs.

In operation, and by way of overview, the height of header 104 is set and combine 100 illustratively moves through a field in the direction indicated by arrow 146. As it moves, header 104 engages the crop to be harvested and gathers it toward cutter 106. After it is cut, the crop can be engaged by reel 105 that moves the crop to feeding tracks. The feeding tracks move the crop to the center of the header 104 and then through a center feeding track in feeder house 108 toward feed accelerator 109, which accelerates the crop into thresher 111. The crop is threshed by rotor 112 rotating the crop against concaves 114. The threshed crop is moved by a separator rotor in separator 116 where some of the residue is moved by discharge beater 126 toward a residue subsystem. It can be chopped by a residue chopper 140 and spread on the field by spreader 142. In other implementations, the residue is simply dropped in a windrow, instead of being chopped and spread.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

As combine 100 moves in the direction indicated by arrow 146, it may be that the ground under header 104 contains obstacles or is uneven. Header 104 is thus provided with ground engaging elements (such as shoes or gauge wheels) that engage the surface of the ground over which combine 100 is traveling. Combine 100 is also provided with float force assembly 170. Float force assembly 170 is shown schematically in FIG. 1, and applies a float force, that is illustratively a lifting force that acts against gravity, biasing main frame 107 of header 104 in an upward direction relative to attachment frame 110. Therefore, as the ground under header 104 rises, the ground engaging elements on header 104 engage the rising ground surface and push upwardly on main frame 107. The float force applied by float force assembly 170 assists in raising header 104 up to follow the rising ground surface. In areas where the ground falls off, the weight of header 104 overcomes the float force so that it descends to its ground following set point or to a point where the ground engaging elements again engage the surface of the ground.

Similarly, if header 104, or one of the ground engaging elements on header 104, engage an obstacle (such as by striking a stone, a clump of dirt, a root ball, etc.), this impact may impart an upwardly directed force on header 104 as well. This upwardly directed force will be relatively sharp and of short duration (or pulsed). Again, as when the ground rises under header 104, the float force applied by float force assembly 170 assists in raising header 104 up, in response to the upwardly directed force imparted by the impact with the obstacle. This acts to absorb some of the impact and allow the header 104 to rise above the obstacle. The weight of the header 104 then causes it to act against the float force and return to its ground following position.

Figure 2:
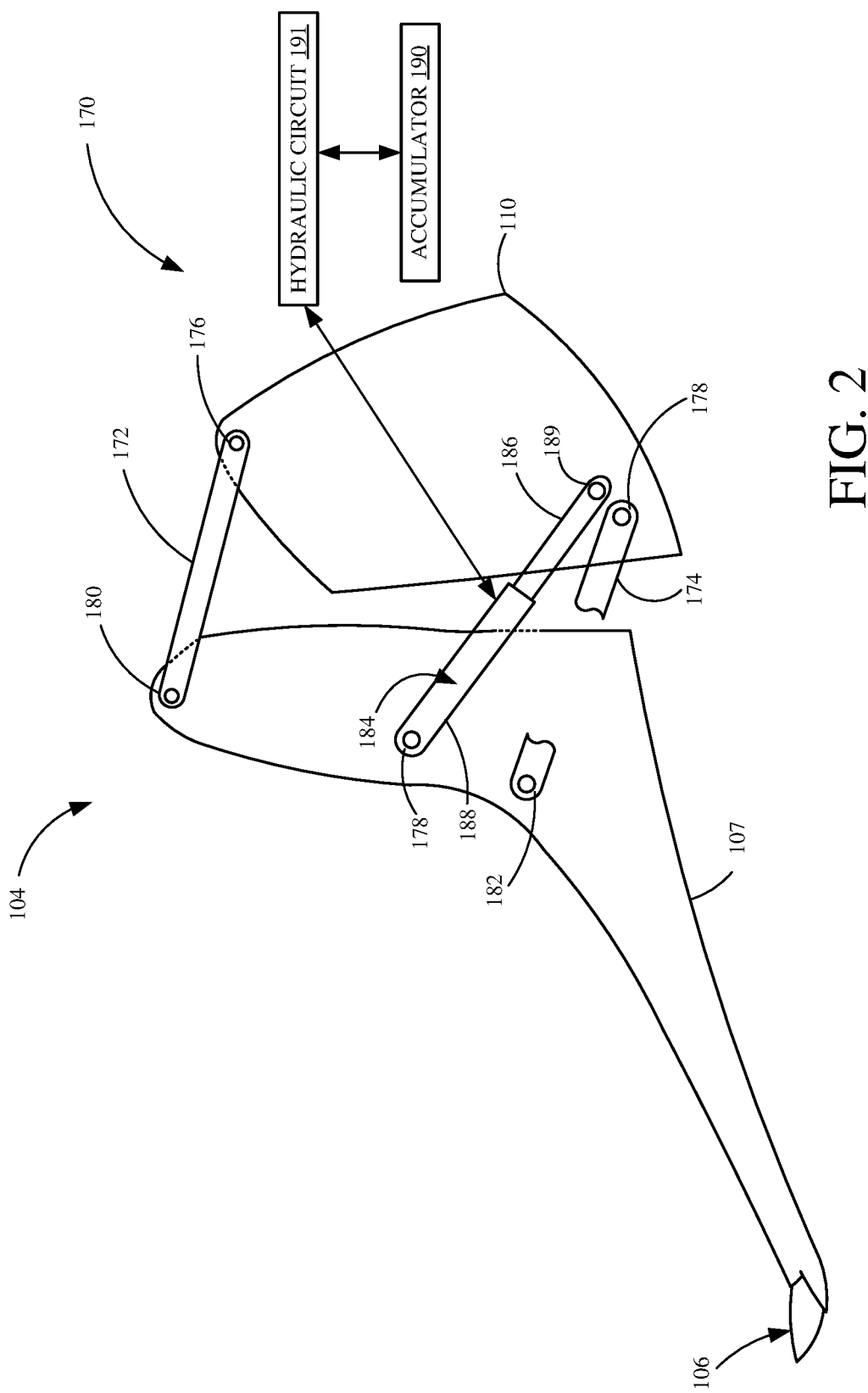
FIG. 2 shows one example of a float force assembly with an attachment frame and main frame in a first position relative to one another.

FIG. 2 shows one example of a portion of header 104 with a float force assembly 170, that applies a float force, to header 104. In the example shown in FIG. 2, some elements are similar to those shown in FIG. 1, and they are similarly numbered.

FIG. 2 shows that main frame 107, which supports cutter 106 and reel 105 (not shown in FIG. 2) is at a first position relative to attachment frame 110. Attachment frame 110 illustratively includes an attachment mechanism (not shown) that attaches to a corresponding attachment mechanism on feeder house 108. The vertical movement of main frame 107 relative to attachment frame 110 is illustratively driven by ground engaging elements, such as gauge wheels, shoes or skis (not shown) which act to raise and lower main frame 107 relative to attachment frame 110 as the ground over which the ground engaging elements move rises and falls, respectively. As mentioned above, vertical movement can also be driven by the impact of one of the ground engaging elements or the header 104 with an obstacle. In another example, main frame 107 can also be tilted relative to attachment frame 110 by a tilt actuator (also not shown).

In the example illustrated in FIG. 2, a set of control arms 172 and 174 are pivotally connected to attachment frame 110 at pivot points 176 and 178, and are pivotally attached to main frame 107 at pivot points 180 and 182, respectively. Control arms 172 and 174 control the path of movement of main frame 107 relative to attachment frame 110 when the position of main frame 107 relative to attachment frame 110 changes to follow the ground. This is just one example of an arrangement for controlling the path of movement.

Float force assembly 170 illustratively includes cylinder 184 that is pivotally connected to attachment frame 110 at pivot point 187, and that is pivotally attached to main frame 107 at pivot point 189. Hydraulic cylinder 184 has a rod portion 186 reciprocally mounted within cylinder portion 188. Assembly 170 also illustratively includes an accumulator 190. Accumulator 190 is shown schematically in FIG. 2 and is shown attached to cylinder 184, through a hydraulic circuit 191. It will be appreciated that, in one example, it can be internal to hydraulic cylinder 184. In another example, accumulator 190 and circuit 191 can be separate from hydraulic cylinder 184 and fluidically coupled to hydraulic cylinder 184. In one example, there are at least two float force assemblies 170, disposed in spaced relation to one another across the header 104. This is just an example.

Accumulator 190 can take a wide variety of different forms. For instance, the accumulator 190 can include a diaphragm or other pressure transmitting mechanism. The diaphragm can have one side in fluid communication with the rod end of cylinder 184 and has a compressible fluid or a compressible gas disposed on its other side. When rod portion 186 is extended further out cylinder portion 188, the pressure increases in the rod end of cylinder 184, and the diaphragm compresses the compressible medium in accumulator 190, thus increasing the pressure in accumulator 190. When rod portion 186 is further retracted into of cylinder portion 188, then the pressure in the base end of cylinder 184 is reduced, and the compressible medium expands, pushing against the diaphragm (or other movable member) so that the pressure in accumulator 190 is reduced and hydraulic fluid is drawn from the accumulator 190 into the rod end of the cylinder.

Figure 3:
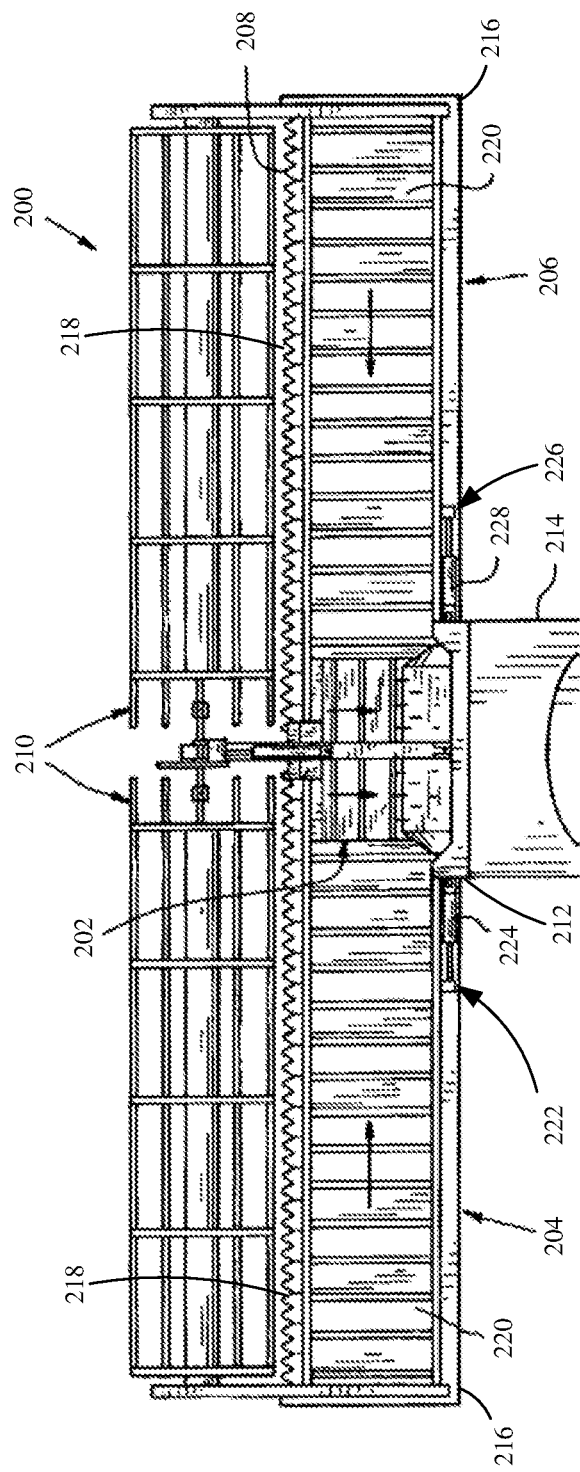
FIG. 3 illustrates an example header for a combine harvester.

FIG. 3 illustrates an example cutting platform 200, in the form of a draper (also referred to as draper 200), that can be attached to a feeder house of a combine. Cutting platform 200 generally includes a plurality of platform sections 202, 204 and 206, a cutter bar assembly 208 and a reel assembly 210. In the example shown, platform section 202 comprises a center section (also referred to as center section or frame 202), platform section 204 comprises a first wing section (also referred to as first wing 204), and platform section 206 comprises a second wing section (also referred to as second wing 206). In one example, center section 202 comprises, or is attached to, a header main frame 212 (such as main frame 107) and the first and second wings 204 and 206 are movably attached to left and right sides, respectively, of center section 202. For example, main frame 212 can be attached to an attachment frame (not shown in FIG. 3) through a float cylinder (not shown in FIG. 3), where the attachment frame is attached to feeder house 214. Although shown with three platform sections, cutting platform 200 may be configured with more or less platform sections, depending upon the particular application.

Each of the first and second wings 204 and 206 generally includes a frame 216, a plurality of arms coupled with the respective frame 216, a cutter bar 218 carried by the outboard ends of the arms, an endless belt 220, and a plurality of belt guides (not shown in FIG. 3). Each cutter bar 218 includes a plurality of knives carried by a bar (not specifically shown). The particular type of knife can vary, such as a single blade knife or a double blade knife. The bar is formed from a metal which is flexible to an extent allowing a desired degree of flexure across the width of cutting platform 200.

The frame 216 of first wing 204 and second wing section 206 are each pivotally coupled with center section 202, such that the outboard ends of first wing section 204 and second wing section 206 can move up and down independent from center section 202. To that end, a lift cylinder is coupled between the frame of the combine and feeder house 214 and lifts the entire cutting platform 200. Tilt cylinders are coupled between the respective frames 216 of the first and second wings 204 and 206, and operate to pivotably move first and second wings relative to center section 202. The tilt cylinders illustratively operate to raise first and second wings 204 and 206 to a transport mode.

Each wing section 204 and 206 includes a respective float force assembly that applies a float force to the wing section that assists in raising the wing section up, relative to the center section 202, for instance in response to an upwardly directed force imparted by an impact with an obstacle. This acts to absorb some of the impact and allow the wing to rise above the obstacle. The weight of the wing then acts against the float force and to return the wing to its ground following position. In the illustrated example, a first float force assembly 222 includes a float cylinder 224 that is attached to the frame 216 of first wing 204. Similarly, a second float force assembly 226 includes a float cylinder 228 that is attached to the frame 216 of second wing 206. Each float cylinder 224 and 228 is fluidically coupled to a respective accumulator by hydraulic (or other fluid) circuitry.

In one example system, the hydraulic circuit allows hydraulic fluid to freely flow through a hydraulic conduit between the float cylinder and the accumulator. This can present difficulties. For instance, when the traction unit lowers the header onto uneven ground (such as the crest of a hill), one or both of the wings 204 and 206 may be positioned a substantial distance from the ground when the center section 202 engages the ground at the crest. In this case, the wing(s) (e.g., when released or unlocked from the center section 202) can fall quickly until they hit the ground with a large impact, which can be perceived by the operator of the traction unit and/or can damage the header or traction unit.

For sake of further illustration, assume a combine makes a first pass across a substantially level terrain. When the combine reaches the end of the pass, the wings are locked in their current position as the header is raised for a turn to a make a subsequent parallel (or other orientation) pass on the terrain. However, this subsequent pass may be on substantially uneven ground, such that when the header is lowered and the wings are unlocked, one or more of the wings fall quickly until they impact the ground.

However, if the float force on the wings is too high during a harvesting operation in which the header is following the ground, the wings will not fall fast enough after striking an obstacle (or when the ground falls away) to follow the ground, which results in missed crop and poor harvesting performance.

Additionally, when the wing sections are locked (e.g., by locking the float force applied by the float cylinder), and the header is lifted, the wings will be oriented relative to the center section based on the terrain that the header was on at the time the wings were locked. Thus, if the header is on the crest of a hill, the wing sections will be locked in a position that is lower than the center section. When the harvesting machine is then moved, such as making a turn for a subsequent pass, the terrain may change such that the ground beneath the wing section(s) rises. For example, if the center section is positioned at the apex of the crest of the hill, and then the machine is moved to flat ground, one or more of the wing sections may impact the ground due to the wings being locked in a position that is lower relative to the center section.

Figure 4:
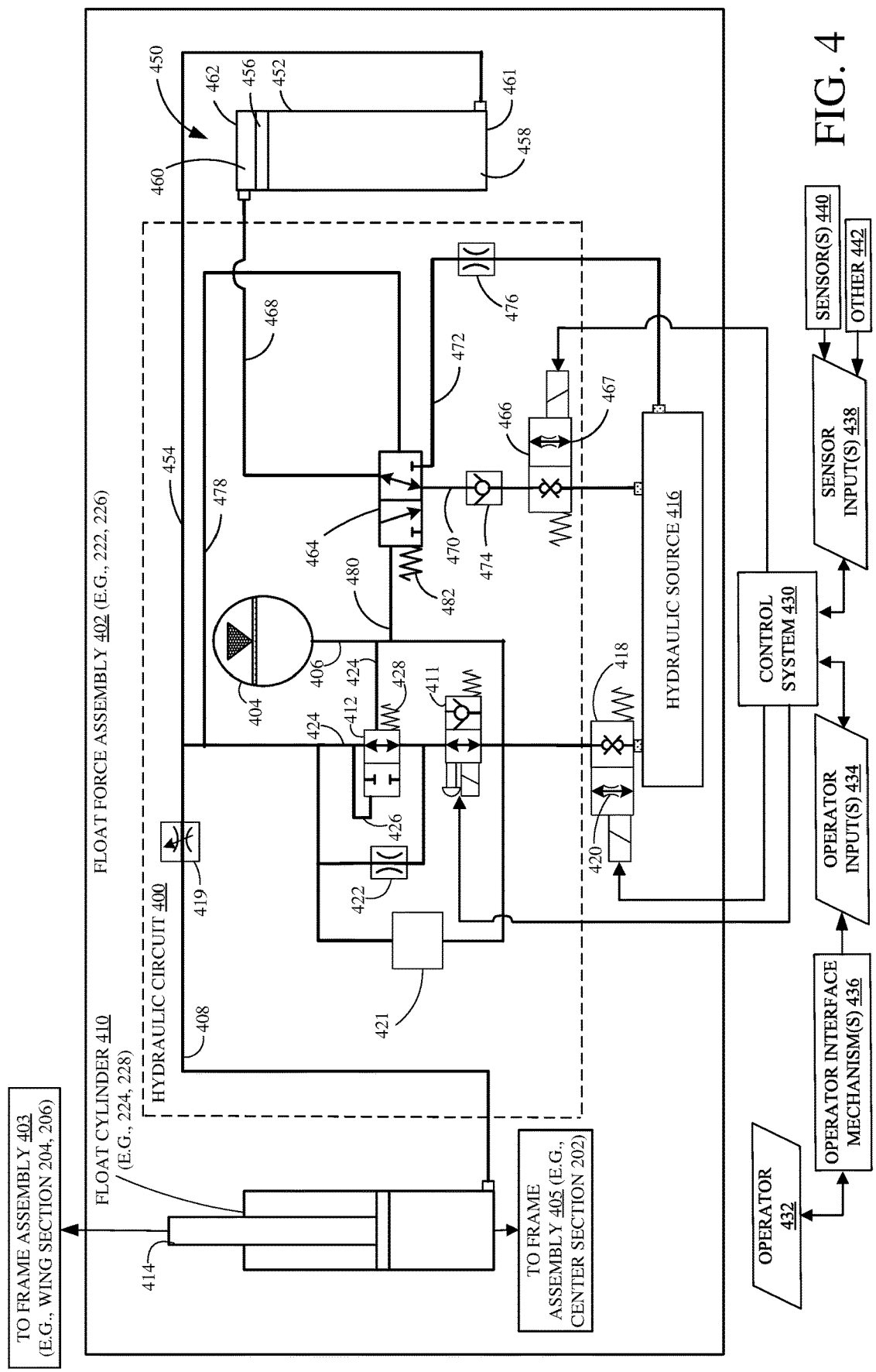
FIG. 4 is a schematic diagram of one example of a hydraulic circuit for a float force assembly.

FIG. 4 is a schematic diagram of one example of a hydraulic circuit 400 of a float force assembly 402 for a header. For sake of illustration, but not by limitation, hydraulic circuit 400 and float force assembly 402 will be described in the context of float force assembly 222 (or 226) of draper 200. However, circuit 400 and assembly 402 can be utilized in other types of header platforms as well.

Float force assembly 402 is configured to provide a float force on a frame assembly 403 of the header relative to another frame assembly 405. In the present example, frame assembly 403 comprises wing section 204 (or 206) and frame assembly 405 comprises center section 202 to which wing section 204 is pivotable connected. In one example, each wing section 204 and 206 can have a separate float force assembly 402 for providing a float force on the respective wing section 204, 206 relative to center section 202.

Additionally, float force assembly 402 includes leveling features that are configured to level wing section 204 (or at least make wing section 204 more level relative to center section 202) during a lifting operation. As discussed in further detail below, in examples described in the present specification, the leveling features do not require additional cylinders or other mechanisms to be connected to the frame components to position the wing section nor require that hydraulic fluid is added or removed from the float circuitry, both of which can have negative impact on terrain following performance.

Briefly, for sake of illustration, and as discussed in further detail below, when a lifting operation of the header is to be performed, float force assembly 402 locks the position of wing section 204 relative to center section 202, by hydraulically isolating the corresponding float cylinder from its respective accumulator. When the header is lifted off the ground, the wing leveling features operate to add additional hydraulic fluid, in the float circuitry, to the float cylinder. This actuates the float cylinder, and raises wing section 204 to a more level position. When the header is subsequently lowered, the wing section 204 is released from the locked position relative to center platform 202, and hydraulic circuit 400 is configured to provide restricted hydraulic fluid flow to damp or slow the rate at which wing section 204 is lowered to the ground, thus reducing the impact wing section 204 has with the ground. Thus, float force assembly 402 is also configured to provide a damped float response during a lowering operation of frame assembly 403.

FIG. 4 shows that an accumulator 404 is hydraulically coupled through one or more hydraulic fluid conduits, defined for example by tubes 406 and tube 408. Tube 406 and the defined conduit may be referred to hereinafter as conduit 406 and the tube and defined conduit 408 may be referred to hereinafter as conduit 408. One example accumulator is described above with respect to accumulator 190.

Hydraulic circuit 400 also includes one or more valve mechanisms configured to control the flow of hydraulic fluid through conduits 406 and 408 between accumulator 404 and a float cylinder 410. One example float cylinder is described above with respect to float cylinder 184.

Hydraulic circuit 400 includes a first control valve 411 and a second control valve 412. Control valve 411 is movable between an open position (illustrated in FIG. 4) that allows fluid flow therethrough and a closed position that blocks fluid flow. Accordingly, control valve 411 is actuatable to a closed position (moved to the left in FIG. 4) which hydraulically isolates float cylinder 410 from accumulator 404, which has the affect of locking float cylinder 410, and thus the position of frame assembly 403 relative to frame assembly 405.

A rod 414 of float cylinder 410 is connected to frame assembly 403 and an end of cylinder 410 is hydraulically coupled to accumulator 404 through hydraulic circuit 400. The base end of cylinder 410 is connected to frame assembly 405.

Control valve 412 is also disposed along the fluid path formed by the conduit(s) between accumulator 404 and float cylinder 410 and is configured to selectively control the flow of hydraulic fluid between accumulator 404 and float cylinder 410. As discussed in further detail below, control valve 412 is operable to selectively configure hydraulic circuit 400 to provide a first, substantially unrestricted flow between float cylinder 410 and accumulator 404, and to provide a second, restricted flow (that is restricted relative to the first flow) between float cylinder 410 and accumulator 404.

Briefly, during a normal, non-lifted operation (i.e., ground-engaging elements of frame assemblies 403 and 405 are on the ground), valves 411 and 412 are in an open position (i.e., in FIG. 4, control valve 411 is moved to the right and control valve 412 is moved to the left), so that the hydraulic fluid can pass through hydraulic circuit 400 substantially unrestricted. As such, when frame assembly 403 (or its ground engaging elements) receives an impact from an obstacle, there will be an upwardly directed force imparted on the rod 414 of cylinder 410. This will cause rod 414 to retract into cylinder 410, and thus drive hydraulic fluid from the base end of cylinder 410 through hydraulic circuit 400 into accumulator 404.

Hydraulic circuit 400 can also be selectively connected to a hydraulic source 416 on the header and/or traction unit through a control valve 418. During operation, hydraulic source 416 provides a source of pressurized fluid, and is generally isolated from hydraulic circuit 400 by control valve 418 being in the closed position illustrated in FIG. 4. Hydraulic source 416 is selectively couplable to hydraulic circuit 400 by opening control valve 418 to a position that controls the flow of the pressurized hydraulic fluid from (or to) hydraulic source 416. Control valve 418 includes a pressure control valve 420 that, when placed in-line between hydraulic source 416 and hydraulic circuit 400, controls the hydraulic fluid to a pressure set point. This allows control valve 418 to reduce the hydraulic pressure in hydraulic circuit 400 during an over-pressure condition and increase the pressure during an under-pressure condition. Changes in pressure can be caused by, for example but not by limitation, changes in temperature, etc.

Hydraulic circuit 400 can also include a manual valve 419 and/or a pressure relief valve 421. In one example, manual valve 419 comprises a needle valve that is manually operated to open and close conduit 408. Pressure relief valve 421 is configured to open and close in response to threshold pressure events, such as the pressure in conduit 408 reaching a threshold level.

FIG. 4 shows that hydraulic circuit 400 includes a flow restricting feature 422, through which hydraulic fluid flow is controlled by control valve 412. Feature 422 is disposed in parallel with a portion of the fluid flow path along which control valve 412 is disposed, and is configured to restrict the flow of fluid through conduits 406 and 408. Accordingly, when control valve 412 is in the open position shown in FIG. 4, the hydraulic fluid flows between accumulator 404 and float cylinder 410 substantially unrestricted. However, when control valve 412 is in the closed position (moved to the right in FIG. 4), the fluid flow is forced through feature 422, resulting in a restricted flow between accumulator 404 and float cylinder 410. As such, the pressure will not equalize between accumulator 404 and float cylinder 410 as quickly (due to the restriction of feature 422).

In the example of FIG. 4, feature 422 comprises a fixed orifice (also referred to as restricting orifice 422). Of course, other types of flow restricting mechanisms can be utilized. Fixed orifice 422 has an orifice opening that is smaller than the conduit defined by tubes 406 and 408, on either side of orifice 422. Therefore, orifice 422 illustratively restricts the flow of hydraulic fluid through conduits 406 and 408 by a fixed amount. Further, it is noted that the size of orifice 422 can be selected to achieve different affects. That is, its physical side and restrictive properties can be selected to achieve a desired performance. If the orifice is larger (with less flow restriction), than that system will tend to allow float cylinder 410 to move more quickly during a lowering operation than smaller, more restrictive orifice sizes.

In the illustrated example, control valve 411 is configured to be actuated manually and/or automatically by a control system 430. For example, an operator 432 can use a suitable mechanism to control hydraulic circuit 400 to lock the position of frame assembly 403 by closing control valve 411 and isolating float cylinder 410 from accumulator 404. This may be done, for example but not by limitation, when the header is being raised to make a subsequent turn in a field between passes. Some examples are described in further detail below.

In one example, control system 430 includes hardware items (such as processors and associated memory, or other processing components) that perform the associated functions. In addition, the system can be comprised of software that is loaded into a memory and is subsequently executed by a processor or server, or other computing component. The system can also be comprised of different combinations of hardware, software, firmware, etc. These are only some examples of different structures that can be used to form control system 430. Other structures can be used as well.

Control system 430 can detect operator inputs 434 that are provided by operator 432 through operator interface mechanism(s) 436. Control system 430 can also detect sensor input(s) 438 that are provided from one or more various sensors 440. For instance, control system 430 can automatically detect when the header is being raised, or is about to be raised of the ground during a lifting operation. Control system 430 can receive other inputs 442 as well. Control system 430 can then actuate control valve 411 between the open and closed positions shown in FIGS. 4 and 5, respectively, based on one or more of those inputs. This can be done in a wide variety of different ways, and a number of examples will now be described.

In one example, when the operator is providing an input to raise the header, control system 430 can detect that operator input and not only control the lift actuator that is lifting the header, but it can also control the valve 411 to close it up, so that the fluid flow from float cylinder 410 to accumulator 404 is isolated, thereby locking the position of frame assembly 403.

Control valve 412 is actuated between the open and closed positions based on the respective fluid pressures in accumulator 404 and float cylinder 410. As shown in FIG. 4, a first tube or conduit 424 is coupled to conduit 406 and exposes a first side of control valve 412 to the fluid pressure in conduit 406. Similarly, a tube 426 receives fluid from conduit 408, which is exposed to an opposing side of control valve 412. Accordingly, differences in fluid pressure in conduits 406 and 408 automatically actuate control valve 412.

In one example shown in FIG. 4, control valve 412 is biased to the open position by a biasing mechanism 428, such as a spring or other suitable mechanism. Biasing mechanism 428 applies a predefined amount of force against control valve 412, to bias it to the open position. This defines a pressure differential that the pressure in fluid conduit 408 must exceed (relative to the pressure in conduit 406) before control valve 412 is moved to the closed position.

As shown in FIG. 4, wing leveling features 450 of float force assembly 402 are configured to add hydraulic fluid to (or remove hydraulic fluid from) float cylinder 410 when frame assembly 403 is in the locked position (i.e., control valve 411 is closed to hydraulically isolate float cylinder 410 from accumulator 404). By adding hydraulic fluid to float cylinder 410, frame assembly 403 is raised relative to frame assembly 405, such that frame assembly 403 is in a position that is level (or closer to being level) with respect to frame assembly 405. This can operate to reduce the likelihood that frame assembly 405 contacts the ground, as discussed above.

In the illustrated example, float force assembly 402 includes a controllable reservoir 452 that is fluidically coupled to conduit 408 (and thus the fluid path between float cylinder 410 and accumulator 404) by a tube 454. Tube 454 and the defined conduit may be referred to hereinafter as conduit 454. Controllable reservoir 452 is also coupled to hydraulic source 416 by a fluid path formed by a set of one or more tubes or conduits.

Controllable reservoir 452 comprises a movable member that separates a first compartment or portion, that is fluidically coupled to conduit 408, from a second compartment or portion, that is fluidically coupled to the fluid path to source 416. In the illustrated example, controllable reservoir 452 comprises a cylinder (also referred to as cylinder 452) having a movable piston (also referred to as piston 456) disposed therein, that separates first compartment 458 of cylinder 452 from second compartment 460. While controllable reservoir 452 is described in the context of a cylinder, other types of reservoirs can be utilized. For example, reservoir 452 can comprises an accumulator having a movable diaphragm or other pressure transmitting mechanism.

As piston 456 moves toward end 461 of cylinder 452, to which conduit 454 is attached, hydraulic fluid is driven through conduit 454 and into conduit 408. When valve 411 is closed, this movement of hydraulic fluid has the effect of adding hydraulic fluid to float cylinder 410, thereby increasing the pressure in float cylinder 410 to cause rod 414 to extend further out of the cylinder, and actuate frame assembly 403. Similarly, when piston 456 moves towards end 462, hydraulic fluid is pulled into portion 458, from conduit 454, which retracts rod 414.

It is noted that in the present example, float cylinder 410, accumulator 404, controllable reservoir 452, and the conduit(s) connecting these components, form a closed circuit. That is, during operation, the volume of hydraulic fluid in the closed circuit remains substantially unchanged. As such, the leveling features 450 can operate to level frame assembly 403, without adding or removing hydraulic fluid from the portion of the hydraulic circuitry between cylinder 452, float cylinder 410, and accumulator 404.

Hydraulic circuit 400 includes a control valve 464 and a control valve 466. Control valves 464 and 466 selectively couple cylinder 452 with hydraulic source 416, to add hydraulic fluid to, or remove hydraulic fluid from, portion 460, to control movement of piston 456 within cylinder 452. In the illustrated example, control valve 464 is movable between a first position (shown in FIG. 4) that couples conduit 468 to conduit 470, and a second position (moved to the right in FIG. 4) that couples conduit 468 to conduit 472. Control valve 466 is disposed along conduit 470, along with a one-way check valve 474. In the illustrated example, control valve 466 is similar to control valve 418, discussed above. In this manner, control valve 466 is movable between a closed position (shown in FIG. 4) and an open position (moved to the left in FIG. 4) that allows fluid flow therethrough. Illustratively, valve 466 includes a pressure control valve 467. In one example, valve 467 is similar to valve 420, discussed above.

Check valve 474 allows fluid flow (when control valve 466 is open) in a first direction through valve 464 and conduit 468, into cylinder 452. Check valve 474 prevents fluid flow in the opposite direction (i.e., hydraulic fluid is restricted from flowing through conduit 470 into source 416).

Conduit 472 is disposed in parallel with conduit 470, and includes a flow restricting feature 476. In one example, feature 476 is similar to feature 422 discussed above. For example, feature 476 includes a fixed orifice that restricts fluid flow therethrough.

In one example, control valve 464 is actuated by control system 430. Alternatively, or in addition, in the example illustrated in FIG. 4, control valve 464 is actuated based on the pressures in float cylinder 410 and accumulator 404. A conduit 478 is fluidically coupled to conduit 408 and exposes a first side of valve 464 to the fluid pressure in conduit 408 (and thus float cylinder 410). A conduit 480 is fluidically coupled to conduit 406, and exposes a second, opposite side of control valve 464 to pressure in conduit 406 (and thus accumulator 404). Thus, in one example, control valve 464 is actuated in a manner similar to control valve 412.

Control valve 464, in the present example, is also biased by a biasing mechanism 482. Biasing mechanism 482 biases valve 464 to a position that allows fluid flow through conduit 472 to hydraulic source 416 (i.e., it is biased to the right in FIG. 4). Thus, to actuate to the position shown in FIG. 4 that allows fluid flow from source 416 to cylinder 452, the pressure in conduit 478 must overcome the pressure in conduit 480 and the biasing force applied by biasing mechanism 482.

In one example, biasing mechanism 482 is similar to biasing mechanism 428. Thus, biasing mechanism 482 can apply the same force as compared to mechanism 428. In another example, mechanisms 428 and 482 are configured to provide different forces against their respective valves.

Figure 5:
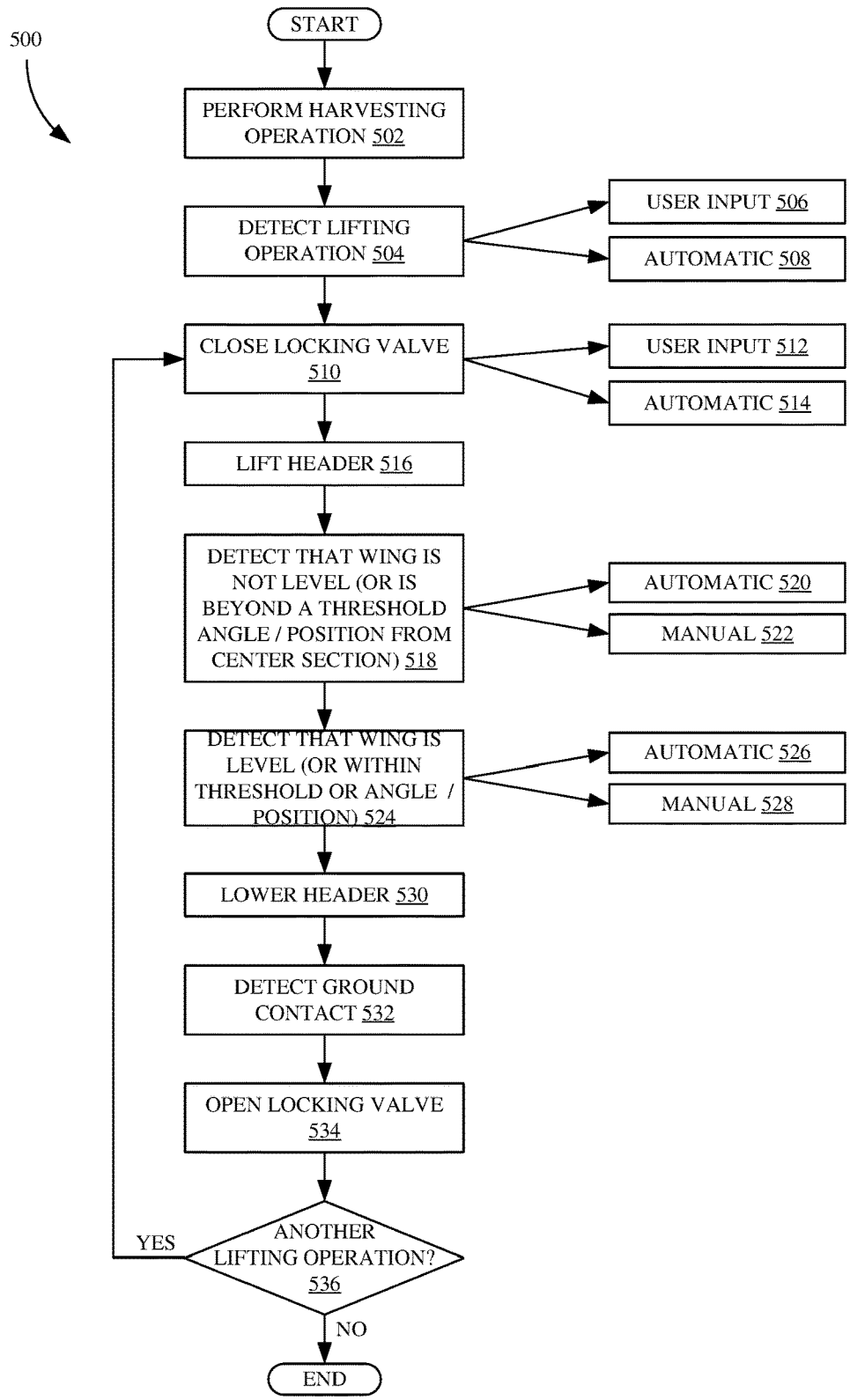
FIG. 5 is a flow diagram illustrating an example method of operation of the hydraulic circuit illustrated in FIG. 4.
Figure 6:
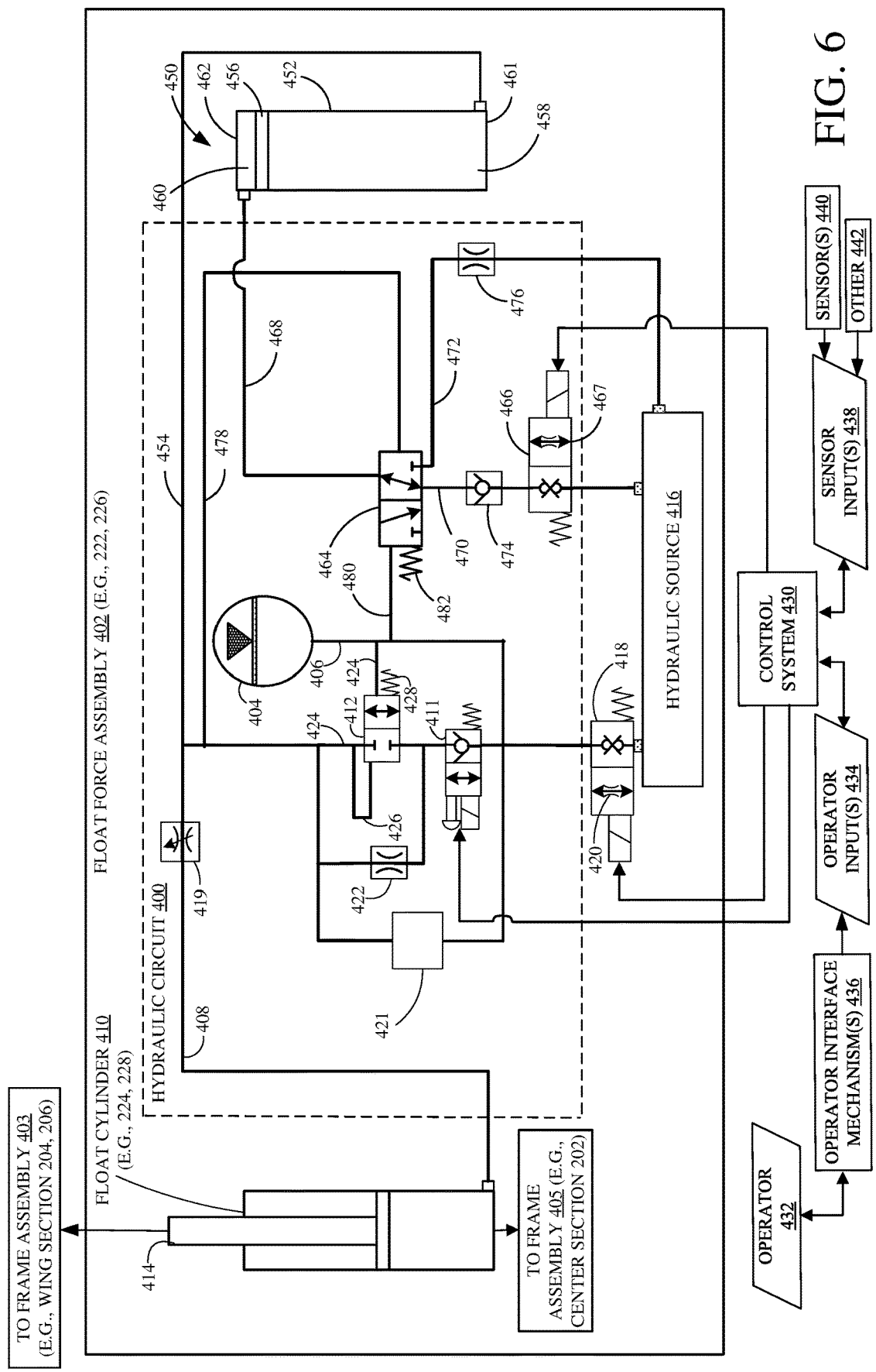
FIGS. 6, 7, and 8 are schematic diagrams of the hydraulic circuit shown in FIG. 4, during the example method of operation shown in the FIG. 5.
Figure 7:
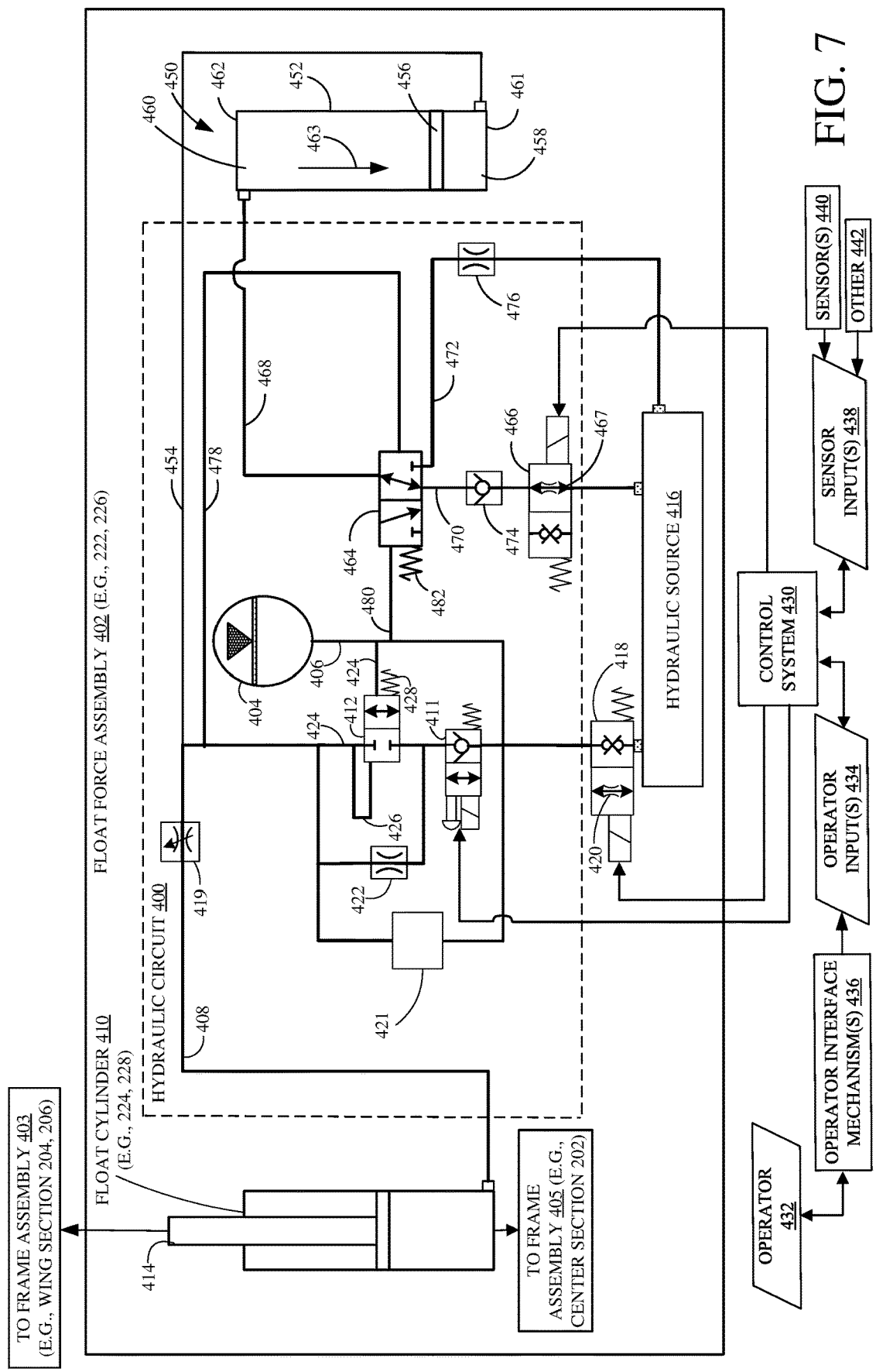
Figure 8:
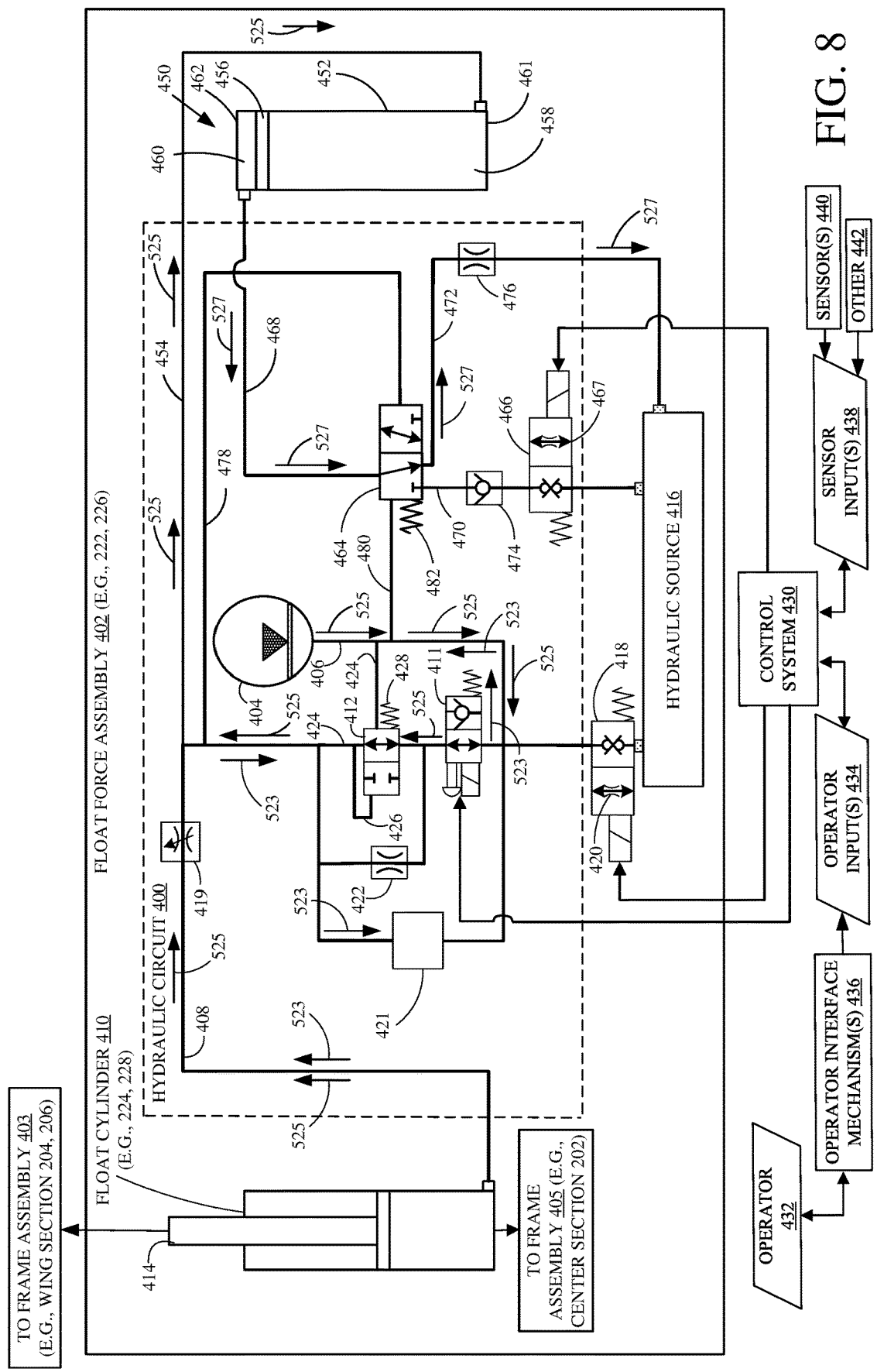

FIG. 5 illustrates an example method 500 of operation of hydraulic circuit 400. For sake of illustration, but not by limitation, method 500 will be described in the context of a lifting operation that lifts a header assembly, and a subsequent lowering operation in which frame assembly 403 (e.g., wing section 204) is released. FIGS. 6, 7, and 8 illustrate operation of hydraulic circuit 400 in conjunction with example method 500.

Method 500 is performed during a harvesting operation, for example. This is represented by block 502. Accordingly, frame assemblies 403 and 405 (e.g., wing section 204 and center section 202) are in a ground-following configuration during a pass of over a terrain.

At block 504, a lifting operation is detected, in which the header is lifted off the ground, for example in preparation of a turn to make a subsequent (e.g., parallel) pass over the terrain. This lifting operation can be based on a user input (block 506), or automatic by control circuitry of the harvesting machine.

At block 510, before the header is lifted off the ground, a locking valve is closed to lock the position of frame assembly 403 (e.g., wing section 204) relative to frame assembly 405 (e.g., center section 202). In this regard, control valve 411 is actuated from the open position shown in FIG. 4, to the closed position shown in FIG. 6. Closing of valve 411 isolates float cylinder 410 from accumulator 404, as discussed above. This can be done in response to a user input (block 512) or automatically (block 514) by control system 430 detecting that the lifting operation is to be performed.

At block 516, the header is lifted off the ground, with the frame assembly 403 in the locked position relative to frame assembly 405. Since the ground is no longer supporting frame assembly 403, the pressure in float cylinder 410 (and thus conduit 408) increases significantly, due to the weight of frame assembly 403 on rod 414.

For sake of illustration, but not by limitation, assume that prior to closing the locking valve at block 510, the pressure in conduit 408 is approximately 1900 pounds per square inch (psi). Because valve 411 is open, the pressure in accumulator 404 and conduit 406 is also approximately 1900 psi. However, when valve 411 is closed at block 510 and the header is then lifted at block 516, the pressure in float cylinder 410 and conduit 408 increases to approximately 3000 psi, while the pressure in accumulator 404 and conduit 406 remains at approximately 1900 psi.

Due to this increase in pressure in conduit 408, the pressure in tube 426 increases relative to the pressure in tube 424, beyond the pressure set point of biasing mechanism 428. In other words, the pressure in conduit 408 is great enough to overcome the fluid pressure in conduit 406 and the force applied by biasing mechanism 428 on valve 412, which causes valve 412 to actuate to the closed position as shown in FIG. 6. In this closed position, flow through conduit 424 is blocked. Similarly, due to this pressure increase in conduit 408, control valve 464 is actuated to the position shown in FIG. 6 in which conduits 470 and 468 are fluidically coupled (a connection between hydraulic source 416 and cylinder 452 is opened).

At block 518, control system 430 detects that frame assembly 403 is not level, for example it is beyond a threshold angle or position with respect to frame assembly 405. This can be done automatically (block 520) and/or based on manual input (block 522). For instance, sensor(s) 440 can provide inputs that indicate the position of frame assembly 403, and control system 430 can determine that frame assembly 403 should be leveled. Alternatively, or in addition, operator 432 can provide input indicating frame assembly 403 is not level, and should be raised.

Based on the detection at block 518, control system 430 actuates control valve 466 to open conduit 470, thereby fluidically coupling hydraulic source 416 to cylinder 452. This is shown in FIG. 7. Pressurized hydraulic fluid from source 416 flows through valves 466 and 464, and into cylinder 452. The increase in fluid pressure in portion 460 of cylinder 452 causes piston 456 to move towards end 461 (as shown by arrow 463), which in turn drives hydraulic fluid out of portion 458 and into conduit 454. Because float cylinder 410 is hydraulically isolated from accumulator 404 (i.e., valve 411 is closed), this fluid flow adds hydraulic fluid to float cylinder 410, which pushes rod 414 out of cylinder 410 and moves frame assembly 403 in an upward direction relative to the ground.

At block 524, the method detects that frame assembly 403 is level, for example it is within a threshold angle or position relative to frame assembly 405. Again, this can be done automatically (block 526) and/or manually (block 528). In either case, control system 430 determines that frame assembly 403 is substantially level and actuates control valve 466 back to the closed position. This is illustrated in FIG. 8.

Once the header is positioned to make the subsequent pass, the header is lowered at block 530. Ground contact is detected at block 532. For instance, control system 430 (or some other component of the machine) detects that the frame assembly 405 (e.g., center section 202) has contacted the ground. In one particular example, this can be done by detecting a location of the attachment frame, that attaches the header to the traction unit, relative to an end stop. For example, ground contact can be detected when the attachment frame has been raised a threshold amount (e.g., ten percent of the overall travel) off a bottom stop that holds the attachment frame when it is in the raise position.

At block 534, in response to detecting the ground contact at block 532, control valve 411 is opened. However, because control valve 412 has been actuated to its close position due to the increased pressure in conduit 408, and control valve 411 is now open, fluid begins to first flow from float cylinder 410 to accumulator 404 through restricting orifice 422. This restricted flow (represented by arrows 523) causes float cylinder 410 to retract more slowly, resulting in a damped lowering of frame assembly 403 to the ground.

Once the flow through restricting orifice 422 lowers the pressure in conduit 408 to a threshold pressure (corresponding to the pressure in conduit 406 and force of biasing mechanism 428), control valve 412 automatically moves back to its open position in which fluid flow between float cylinder 410 and accumulator 404 is substantially unrestricted.

Similarly, the pressure drop in conduit 408 (e.g., due to frame assembly 403 being supported by the ground) causes control valve 464 to open to the position shown in FIG. 8, which opens the fluid path between conduits 468 and 472. This allows fluid flow as represented by arrows 525 in FIG. 8. This flow increases the pressure in portion 458 of cylinder 452, which moves piston 456 towards end 462, which in turn drives hydraulic fluid flow (represented by arrows 527) from portion 460 along conduit 468, through valve 464 and conduit 472, and into hydraulic source 416.

Example 1 is a header assembly for an agricultural harvesting machine, the header assembly comprising:
a first frame assembly;
a second frame assembly that supports a cutter, and is movable relative to the first frame assembly;
a float cylinder coupled between the first frame assembly and the second frame assembly;
an accumulator;
a controllable reservoir; and
fluidic circuitry comprising:
a first conduit forming a first fluid path that provides a flow of pressurized fluid under pressure to the float cylinder, so the float cylinder exerts a float force on the second frame assembly;
a valve mechanism that is actuatable to inhibit fluid flow along the first fluid path between the accumulator and the float cylinder;
a second conduit forming a second fluid path fluidically coupled to the controllable reservoir, the controllable reservoir being controllable to add fluid to the float cylinder.

Example 2 is the header assembly of any or all previous examples, wherein the header assembly comprises a draper platform, the first frame assembly comprises a center section, and the second frame assembly comprises a wing section that is pivotably supported by the center section.

Example 3 is the header assembly of any or all previous examples, wherein the float cylinder, the accumulator, the controllable reservoir, and the fluidic circuitry form a closed fluid circuit.

Example 4 is the header assembly of any or all previous examples, wherein the valve mechanism is actuatable to a closed position that fluidically isolates the float cylinder from the accumulator, and the controllable reservoir is controlled to add fluid to the float cylinder, so the float cylinder exerts a lifting force on the second frame assembly while the float cylinder is isolated from the accumulator.

Example 5 is the header assembly of any or all previous examples, wherein the controllable reservoir comprises a movable member that separates a first compartment, that is fluidically coupled to the second fluid path, from a second compartment, that is fluidically coupled to a source of pressurized fluid.

Example 6 is the header assembly of any or all previous examples, wherein the controllable reservoir comprises a cylinder and the movable member comprises a piston movable within the cylinder Example 7 is the header assembly of any or all previous examples, and further comprising:
a control system configured to control a flow of pressurized fluid, from the source to the second compartment, to actuate the movable member to drive fluid from the first compartment through the second fluid path.

Example 8 is the header assembly of any or all previous examples, wherein the control system is configured to:
detect a position of the second frame assembly relative to the first frame assembly; and
based on the detected position, control the flow of pressurized fluid to move the second frame assembly toward a position that is level with the first frame assembly Example 9 is the header assembly of any or all previous examples, wherein the valve mechanism comprises a first valve mechanism, and further comprising a second valve mechanism that selectively controls fluid flow between the source and the controllable reservoir.

Example 10 is the header assembly of any or all previous examples, wherein the second valve mechanism is movable between a first position, that allows fluid flow from the source to the controllable reservoir, and second position that inhibits fluid flow from the source to the controllable reservoir.

Example 11 is the header assembly of any or all previous examples, wherein the second position allows fluid flow from the controllable reservoir to the source.

Example 12 is the header assembly of any or all previous examples, wherein the second valve mechanism is actuated based on a pressure differential between the float cylinder and the accumulator.

Example 13 is a float force assembly for a harvesting machine header, the float force assembly comprising:

a controllable reservoir; and an accumulator that is fluidically coupled to a float cylinder through a first fluid path that provides pressurized fluid under pressure to the float cylinder, the float cylinder being coupled between a first frame assembly of the harvesting machine header and a second frame assembly that is movable relative to the first frame assembly; and a valve mechanism configured to fluidically isolate the float cylinder from the accumulator, wherein the controllable reservoir is controlled to add fluid to the float cylinder while the float cylinder is isolated from the accumulator.

Example 14 is the float force assembly of any or all previous examples, wherein the harvesting machine header comprises a draper platform, the first frame assembly comprises a center section, and the second frame assembly comprises a wing section that is pivotably supported by the center section.

Example 15 is the float force assembly of any or all previous examples, wherein the controllable reservoir is controlled by a control system to move the second frame assembly toward a position that is level with the first frame assembly.

Example 16 is the float force assembly of any or all previous examples, wherein the controllable reservoir comprises a movable member that separates a first compartment, that is fluidically coupled to the second fluid path, from a second compartment, that is fluidically coupled to a source of pressurized fluid.

Example 17 is the float force assembly of any or all previous examples, wherein the controllable reservoir comprises a cylinder and the movable member comprises a piston movable within the cylinder.

Example 18 is the float force assembly of any or all previous examples, wherein the valve mechanism comprises a first valve mechanism, and further comprising a second valve mechanism movable between a first position, that allows fluid flow from a source to the controllable reservoir, and second position that inhibits fluid flow from the source to the controllable reservoir and allows fluid flow from the controllable reservoir to the source.

Example 19 is the float force assembly of any or all previous examples, wherein the second valve mechanism is actuated based on a pressure differential between the float cylinder and the accumulator.

Example 20 is a header for a harvesting machine, the header comprising:

a main frame assembly;

a wing frame assembly pivotably coupled to the main frame assembly;

a float cylinder coupled between the main frame assembly and the wing frame assembly;

an accumulator;

a controllable reservoir; and fluidic circuitry that is selectively operable to:

fluidically couple the accumulator to the float cylinder to provide a flow of pressurized fluid under pressure to the float cylinder, so the float cylinder exerts a float force on the wing frame assembly, and fluidically isolate the float cylinder from the accumulator, wherein the controllable reservoir is controlled to add fluid to the float cylinder, while the float cylinder is isolated from the accumulator, so the float cylinder exerts a lifting force on the wing frame assembly.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A header assembly for an agricultural harvesting machine, the header assembly comprising:

a first frame assembly;

a second frame assembly that supports a cutter, and is movable relative to the first frame assembly;

a float cylinder coupled between the first frame assembly and the second frame assembly;

an accumulator;

a fluid reservoir; and fluidic circuitry comprising a first conduit, a valve mechanism, and a second conduit, the fluid circuitry having:

a first configuration in which the first conduit forms a first fluid path that provides a flow of pressurized fluid under pressure from the accumulator to the float cylinder which exerts a float force on the second frame assembly; and a second configuration in which the valve mechanism inhibits fluid flow along the first fluid path between the accumulator and the float cylinder and the second conduit forms a second fluid path that adds fluid from the fluid reservoir to the float cylinder to lift the second frame assembly relative to the first frame assembly.

2. The header assembly of claim 1, wherein the header assembly comprises a draper platform, the first frame assembly comprises a center section, and the second frame assembly comprises a wing section that is pivotably supported by the center section.

3. The header assembly of claim 1, wherein the float cylinder, the accumulator, the fluid reservoir, and the fluidic circuitry form a closed fluid circuit.

4. The header assembly of claim 1, wherein the valve mechanism is actuatable to a closed position that fluidically isolates the float cylinder from the accumulator, and the fluid reservoir is controlled to add fluid to the float cylinder, so the float cylinder exerts a lifting force on the second frame assembly while the float cylinder is isolated from the accumulator.

5. The header assembly of claim 4, wherein the fluid reservoir comprises a movable member that separates a first compartment, that is fluidically coupled to the second fluid path, from a second compartment, that is fluidically coupled to a source of pressurized fluid.

6. The header assembly of claim 5, wherein the fluid reservoir comprises a cylinder and the movable member comprises a piston movable within the cylinder.

7. The header assembly of claim 5, and further comprising a control system configured to control a flow of pressurized fluid, from the source to the second compartment, to actuate the movable member to drive fluid from the first compartment through the second fluid path.

8. The header assembly of claim 7, wherein the control system is configured to:

detect a position of the second frame assembly relative to the first frame assembly; and based on the detected position, control the flow of pressurized fluid to move the second frame assembly toward a position that is level with the first frame assembly.

9. The header assembly of claim 8, wherein the valve mechanism comprises a first valve mechanism, and further comprising a second valve mechanism that selectively controls fluid flow between the source and the fluid reservoir.

10. The header assembly of claim 9, wherein the second valve mechanism is movable between a first position, that allows fluid flow from the source to the fluid reservoir, and second position that inhibits fluid flow from the source to the fluid reservoir.

11. The header assembly of claim 10, wherein the second position allows fluid flow from the fluid reservoir to the source.

12. The header assembly of claim 10, wherein the second valve mechanism is actuated based on a pressure differential between the float cylinder and the accumulator.

13. A float force assembly for a harvesting machine header, the float force assembly comprising:
a fluid reservoir; and
an accumulator that is fluidically coupled to a float cylinder through a first fluid path that provides pressurized fluid under pressure to the float cylinder, the float cylinder being coupled between a first frame assembly of the harvesting machine header and a second frame assembly that is movable relative to the first frame assembly; and
a valve mechanism configured to fluidically isolate the float cylinder from the accumulator, wherein the fluid reservoir is controlled to:
while the float cylinder is isolated from the accumulator, add fluid from the fluid reservoir to the float cylinder to lift the second frame assembly relative to the first frame assembly.

14. The float force assembly of claim 13, wherein the harvesting machine header comprises a draper platform, the first frame assembly comprises a center section, and the second frame assembly comprises a wing section that is pivotably supported by the center section.

15. The float force assembly of claim 13, wherein the fluid reservoir is controlled by a control system to move the second frame assembly toward a position that is level with the first frame assembly.

16. The float force assembly of claim 13, wherein the fluid reservoir comprises a movable member that separates a first compartment, that is fluidically coupled to the second fluid path, from a second compartment, that is fluidically coupled to a source of pressurized fluid.

17. The float force assembly of claim 16, wherein the fluid reservoir comprises a cylinder and the movable member comprises a piston movable within the cylinder.

18. The float force assembly of claim 13, wherein the valve mechanism comprises a first valve mechanism, and further comprising a second valve mechanism movable between a first position, that allows fluid flow from a source to the fluid reservoir, and second position that inhibits fluid flow from the source to the fluid reservoir and allows fluid flow from the fluid reservoir to the source.

19. The float force assembly of claim 18, wherein the second valve mechanism is actuated based on a pressure differential between the float cylinder and the accumulator.

20. A header for a harvesting machine, the header comprising:
a main frame assembly;
a wing frame assembly pivotably coupled to the main frame assembly;
a float cylinder coupled between the main frame assembly and the wing frame assembly;
an accumulator;
a fluid reservoir; and
fluidic circuitry comprising a valve mechanism, the fluid circuitry having:
a first configuration in which the accumulator is fluidically coupled to the float cylinder to provide a flow of pressurized fluid under pressure to the float cylinder which exerts a float force on the wing frame assembly, and
a second configuration in which the valve mechanism fluidically isolates the float cylinder from the accumulator and the fluid reservoir is controlled to, while the float cylinder is isolated from the accumulator, add fluid from the fluid reservoir to the float cylinder to exert a lifting force on the wing frame assembly.

* * * * *